No. 613,754. Patented Nov. 8, 1898.
L. H. BRIGHTMAN.
SHAFT STRAIGHTENING MACHINE.
(Application filed Nov. 20, 1896. Renewed Oct. 11, 1898.)
(No Model.) 2 Sheets—Sheet 1.
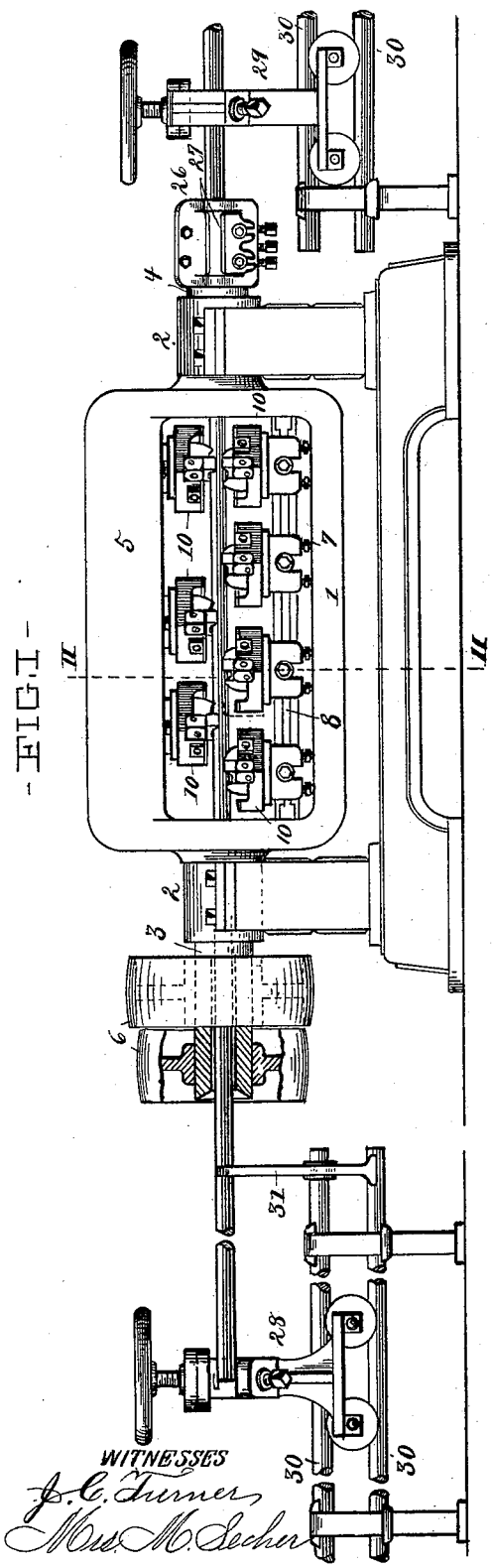
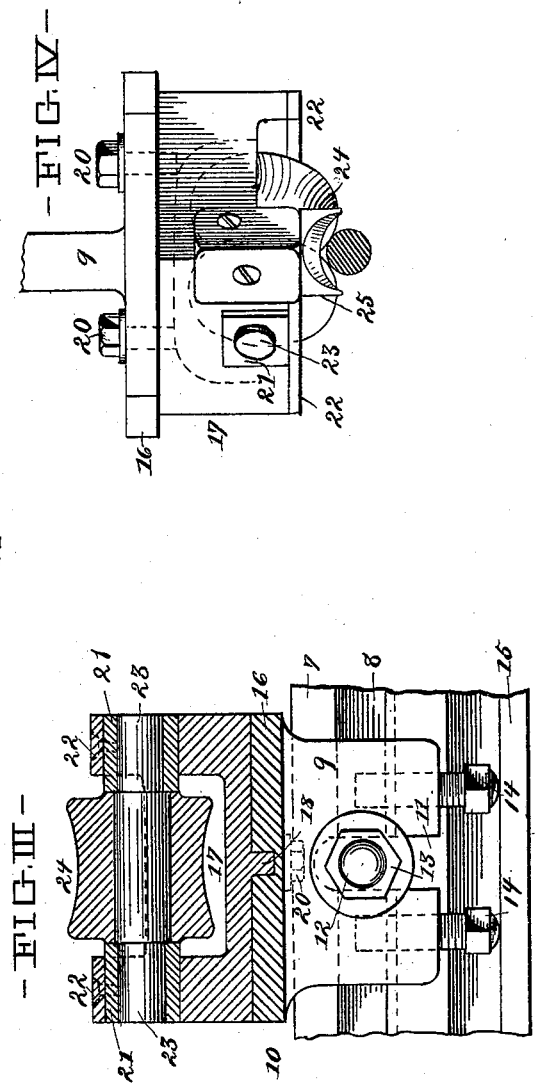
WITNESSES
INVENTOR
L. H. Brightman,
BY
ATTORNEY.

No. 613,754. Patented Nov. 8, 1898.
L. H. BRIGHTMAN.
SHAFT STRAIGHTENING MACHINE.
(Application filed Nov. 20, 1896. Renewed Oct. 11, 1898.)
(No Model.) 2 Sheets—Sheet 2.
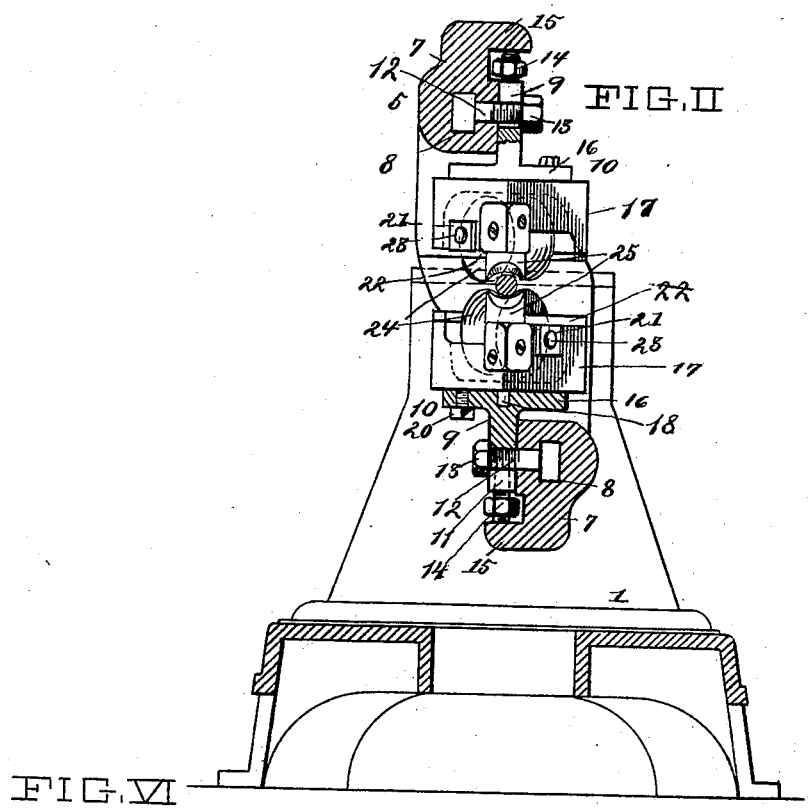
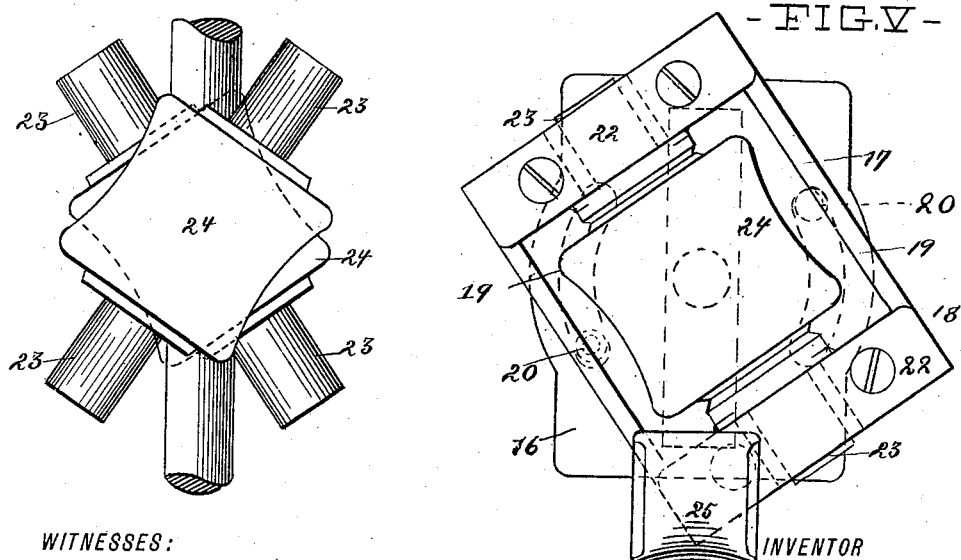
WITNESSES:
INVENTOR
L. H. Brightman,
BY
Wm Lecher
ATTORNEY.

UNITED STATES PATENT OFFICE.

LATHAM H. BRIGHTMAN, OF CLEVELAND, OHIO.

SHAFT-STRAIGHTENING MACHINE.

SPECIFICATION forming part of Letters Patent No. 613,754, dated November 8, 1898.

Application filed November 20, 1896. Renewed October 11, 1898. Serial No. 693,267. (No model.)

*To all whom it may concern:*

Be it known that I, LATHAM H. BRIGHTMAN, a citizen of the United States, and a resident of Cleveland, county of Cuyahoga, and State of Ohio, have invented certain new and useful Improvements in Shaft-Straightening Machines, of which the following is a specification, the principle of the invention being herein explained and the best mode in which I have contemplated applying that principle so as to distinguish it from other inventions.

The annexed drawings and the following description set forth in detail one mechanical form embodying the invention, such detail construction being but one of various mechanical forms in which the principle of the invention may be used.

In said annexed drawings, Figure I represents a side elevation of my improved shaft-straightening machine, illustrating the shaft and guide-rails as broken to bring one shaft-clamp close to the machine; Fig. II, a transverse vertical section of the machine on the line II II in Fig. I; Fig. III, an enlarged section of one of the roller-supports, illustrating the roller and its bearings turned with its axis parallel with the shank of the support; Fig. IV, an enlarged edge view of a roller and its support; Fig. V, a bottom plan view of a roller and its support; and Fig. VI, a diagrammatic plan view of two rollers and a shaft between them.

The machine-frame 1 is formed with two horizontal and longitudinally-alined bearings 2, in which two hollow trunnions 3 and 4, which project from the ends of a substantially rectangular flier-frame 5, are journaled. One trunnion has belt-pulleys 6 or other gearing for communicating rotary motion to the flier-frame. The horizontal sides 7 of the flier-frame are cut away upon opposite faces, and said faces have inwardly-widening grooves 8, preferably T-shaped in cross-section. The flat shanks 9 of the roller-supports 10 have longitudinal slots 11, through which the ends of bolts 12 project, said bolts having their heads and inner portions of their shanks fitting in the grooves and having nuts 13, by means of which the bolts may be adjusted in the grooves, and the slotted shanks may be adjusted upon the bolts. Screw-bolts 14 are threaded into the ends of the roller-support shanks and bear with their outer ends against flanges 15, formed by cutting away the horizontal sides of the flier-frame. The shanks and supports are adjusted toward and from the axial line of the flier-frame by these bolts. The shanks of the roller-supports project from plates 16, and the flat faces of bearing-blocks 17, in which the rollers are journaled, bear against said plates and are swiveled upon the same by means of pivot-studs 18. The plates 16 are formed with segmental slots 19, concentric with the pivot-studs, and screw-bolts 20 project through said slots and into the flat faces of the bearing-blocks for the purpose of clamping the bearing-blocks in their adjusted swiveled positions. The bearing-blocks have removable boxes 21 in their ends, secured in place by caps 22. The trunnions 23 of rollers 24, having concave peripheries, are journaled in said boxes. The concave peripheries of the rollers are formed on the arc of a circle in cross-section. Guide-blocks 25 are secured upon the corners of the bearing-blocks which present toward the feed end of the flier-frame and have their inner faces outwardly beveled and concave, so as to guide the end of the shaft or round bar to the roller. The roller-supports are secured to the sides of the flier-frame so as to project alternately from opposite sides, excepting at the discharge end of the frame, where two rollers are directly opposed. The roller-supports are so adjusted in the flier-frame that the rollers will project so far within the path of the shaft that they may deflect the latter just as much as it will bear and again return to a perfectly-straight line, the degree of such deflection being governed by the thickness of the shaft and the elasticity or springiness of the metal in the same. A frame 26 is secured to the end of the discharge-trunnion of the flier-frame and has two opposed pads 27, of wood or similar material, which bear against the bar or shaft as it leaves the straightener and serve to polish the same. Clamps 28 and 29 travel upon tracks 30 and have means for centering their jaws with the axial line of the flier-frame, according to the thickness of the bar or shaft. A steady-rest 31 is preferably provided at the feed end of the inlet-trunnion of the flier-frame.

In practice, after the rollers have been adjusted in their proper positions as to distance from the axis of the flier-frame and angle to the longitudinal axis and plane of the frame according to the thickness of the shaft or round bar and the rate of feed for the latter through the machine, the flier-frame is started to rotate and the end of the shaft is inserted at the feed end of the flier-frame, having previously been centered and clamped in the supporting-clamp. As soon as the revolving rollers begin to act upon the shaft they will feed the latter through the machine, when it may be secured in the other clamp by the end leaving the frame. The straightening of the shaft or bar will be accomplished by the continuous deflection from all sides of the shaft by the alternating rollers. The contact of the concave peripheries of the revolving rollers in the rotating frame will produce varying peripheral speeds at the various portions of their peripheries, thus causing slipping of certain portions of the peripheries upon the surface of the shaft. This action will smooth and polish the shaft, particularly at the directly-opposed set of rollers, which polish will be still further finished by the polishing device upon the discharge-trunnion.

As the groove or concave of the peripheries of the rollers is formed on the segment of a circle and the rollers are placed at an angle to the shaft according to the diameter of the same, each roller will have a segmental line of contact with the shaft. This will prevent all gouging out or breaking of edges of flaws or cracks which might be found in the surface of the shaft and will admit of such flaws and cracks being smoothed over.

When I use the term "shaft" or "bar," all round bars are included, whether solid or hollow and whether formed with a small inner bore or in the shape of an actual pipe or tube.

Other modes of applying the principle of my invention may be employed for the mode herein explained. Change may therefore be made as regards the mechanism thus disclosed, provided the principles of construction set forth respectively in the following claims are employed.

I therefore particularly point out and distinctly claim as my invention—

1. In a machine for straightening round bars of metal, the combination with a revolving flier-frame having hollow trunnions, of freely-revolving rollers arranged to alternately project from opposite sides of said frame and having concave peripheries bearing against the bar at an angle to the same, substantially as set forth.

2. In a machine for straightening round bars of metal, the combination with a revolving flier-frame having hollow trunnions, of freely-revolving rollers arranged to alternately project from opposite sides of said frame and having concave peripheries bearing against the bar at an angle to the same and provided with means for adjusting them toward and from the axis of the flier-frame, substantially as set forth.

3. In a machine for straightening round bars of metal, the combination with a revolving flier-frame having hollow trunnions, of freely-revolving rollers arranged to alternately project from opposite sides of said frame and having concave peripheries and provided with means for adjusting them in planes transverse to the plane of and substantially parallel to the axis of the revolving flier-frame, substantially as set forth.

4. In a machine for straightening round bars of metal, the combination with a revolving flier-frame having hollow trunnions, of rollers arranged to alternately project from opposite sides of said frame and having concave peripheries bearing against the bar at an angle to the same, and a pair of similarly constructed and set rollers arranged directly opposite each other at the delivery end of the frame, substantially as set forth.

5. In a machine for straightening round bars of metal, the combination with a revolving flier-frame having hollow trunnions, of rollers arranged to alternately project from opposite sides of said frame and having concave peripheries bearing against the bar at an angle to the same, and guide-blocks having concave beveled faces and arranged at the points of feed to each roller, substantially as set forth.

In testimony that I claim the foregoing to be my invention I have hereunto set my hand this 30th day of September, A. D. 1896.

LATHAM H. BRIGHTMAN.

Witnesses:
  Mrs. M. SECHER,
  WM. SECHER.